United States Patent [19]

Gaudin et al.

[11] Patent Number: 4,925,556
[45] Date of Patent: May 15, 1990

[54] METHOD FOR THE MANUFACTURE OF FLOORS FOR FILTERS, AND FLOORS THUS MADE

[75] Inventors: Marie-Pierre Gaudin, Saint Germain en Laye; Daniel Meindre, Rueil Malmaison; Vincent Savall, Velizy Villacoublay, all of France

[73] Assignee: Degremont, Rueil Malmaison, France

[21] Appl. No.: 294,113

[22] Filed: Jan. 6, 1989

[30] Foreign Application Priority Data

Jan. 15, 1988 [FR] France ............... 88 00433

[51] Int. Cl.⁵ ............... B28B 1/16; B01D 23/18
[52] U.S. Cl. ............... 210/293; 52/251; 52/259; 264/256; 264/DIG. 57
[58] Field of Search ............... 52/250, 251, 252, 259; 210/232, 279, 289, 293, 541; 264/133, 256, 271.1, 275, 333, DIG. 57

[56] References Cited

U.S. PATENT DOCUMENTS

| | | | |
|---|---|---|---|
| 1,189,521 | 7/1916 | Allen | 210/232 |
| 1,334,729 | 3/1920 | Ambursen | 52/252 |
| 1,572,398 | 2/1926 | Leopold | 210/293 |
| 2,710,692 | 6/1955 | Kegel et al. | 210/293 |
| 3,110,667 | 11/1963 | Stuppy | 210/293 |
| 3,403,492 | 10/1968 | Spencer | 52/251 |
| 3,456,804 | 7/1969 | McGivern | 210/293 |
| 3,808,299 | 4/1974 | Svensson | 264/DIG. 57 |
| 3,956,134 | 5/1976 | Sturgill | 210/293 |
| 4,774,045 | 9/1988 | Kushida et al. | 264/256 |

FOREIGN PATENT DOCUMENTS

| | | | |
|---|---|---|---|
| 48331 | 6/1911 | Austria | 210/293 |
| 696980 | 9/1940 | Fed. Rep. of Germany | 210/293 |
| 841443 | 4/1952 | Fed. Rep. of Germany | 210/293 |
| 1302745 | 7/1973 | Fed. Rep. of Germany | 210/293 |
| 2416870 | 11/1975 | Fed. Rep. of Germany | 264/DIG. 57 |
| 2847076 | 5/1980 | Fed. Rep. of Germany | 210/293 |
| 2450310 | 10/1980 | France | 52/252 |
| 2450626 | 10/1980 | France | 210/293 |
| 2596385 | 10/1987 | France | 210/293 |

*Primary Examiner*—Frank Spear
*Assistant Examiner*—Joseph Drodge
*Attorney, Agent, or Firm*—Sandler, Greenblum & Bernstein

[57] ABSTRACT

A method for making floors for filters, particularly for filters including a granular filtrating material, wherein the method includes forming two stages. The first stage is made by casting in concrete or the equivalent, at least one carrier self-supporting element or pre-slab, formed with openings in which are housed elements, such as nozzles, for the introduction of fluids used for washing the filter. Then the second stage is formed, during which, once the carrier self-supporting elements have been put in position on the supports of the filter, concrete is cast in a single operation on this element or elements, in a quantity sufficient for reaching the required total thickness of the floor and thereby providing a slab which will receive the filter granular material.

7 Claims, 2 Drawing Sheets

METHOD FOR THE MANUFACTURE OF FLOORS FOR FILTERS, AND FLOORS THUS MADE

BACKGROUND OF THE INVENTION

Some filtration operations are carried out with filters, particularly filters made of a granular filtering material, the structure of which is generally reinforced concrete and includes, primarily, a bed plate which bears on shells or walls about the periphery and a perforated floor supporting the filtering material.

This bed plate is perforated for allowing the passage and flow of the liquid, particularly water, which is filtered by the material, as well as the passage and distribution of the washing fluids. For so doing, it includes a sufficiently high number of openings provided with recovery members for the filtered liquid and for the distribution of the washing fluids. Moreover, this floor has to be designed and made in such manner as to support large vertical forces which alternately descend and ascend. Therefore, the floor structure has to include sufficient anchoring elements for accommodating these alternating forces.

The present invention relates to a method for making the floor of these filters.

The known techniques consist in the assembly of small dimensional prefabricated slabs. These slabs which are prefabricated in the workshop or at the site are put in position and connected to the support elements and are connected to each other by a system of plates and bolts used for anchoring purposes. A seal is then made between each of the slabs and the periphery of the filter in order to ensure tightness.

This system of plates, sealing stems and bolts involves a costly connection process, which is not satisfactory from the mechanical point of view and is difficult to practice. Moreover, the seal which is delicate and difficult to make necessitates skilled labor.

Another technique consists in making some floors by casting a reinforced concrete slab on a bottom layer such as a plastic shuttering, called a permanent shuttering, which is previously put in position on the filter supports.

Due to the forces to which it is subjected, this floor has to be either of a large thickness, in which is necessary to reinforce the shuttering which has a very reduced mechanical strength with a complex reinforcing system, which is costly, or it requires a system including very close supports, with very short spans between the supports and is therefore also very costly.

BRIEF DESCRIPTION OF THE DRAWINGS

The invention is further explained in the description which follows with reference to the drawings illustrating, by way of a non-limiting example, an embodiment of the invention wherein.

DETAILED DESCRIPTION OF THE INVENTION

The method according to the invention eliminates the disadvantages described above and allows forming a continuous floor which may be of a small thickness and with large spans between supports.

The method according to the invention is characterized substantially in that it includes two stages.

Figure 1:
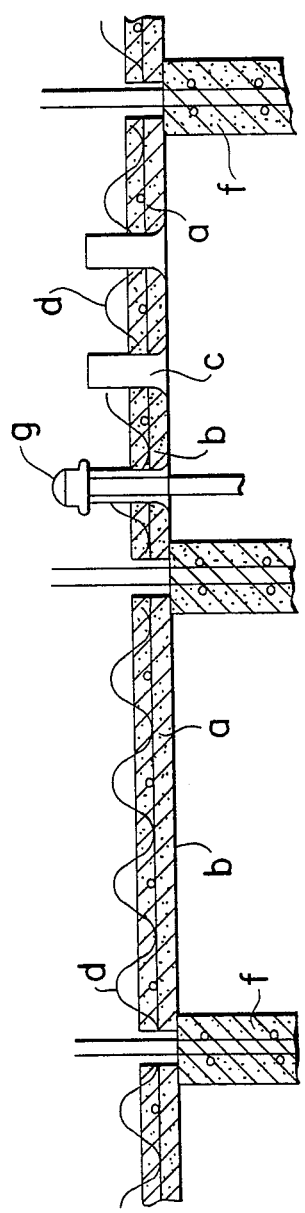
FIG. 1 is a partial sectional view of a floor after the first stage.
Figure 2:
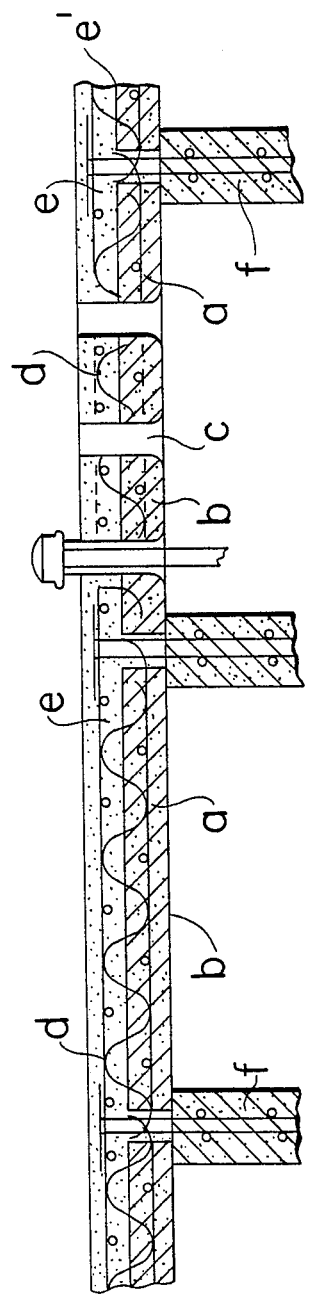
FIG. 2 is a partial sectional view of a floor after the second stage.

During a first stage, one makes, as is shown in FIG. 1, a mixed carrier self-supporting element, or pre-slab, made advantageously of a cast concrete a and of a permanent shuttering or bottom layer b, with openings c for positioning in the floor, means such as a nozzle g for the introduction in the filter of air and water used for washing.

The thickness of the pre-slab is less than or equal to half the total thickness of the floor when it is complete.

According to the invention, provisions are made to include in the element or elements forming the pre-slab, a reinforcement d for the connection with slab e which is formed during the second stage of the method.

Another technique for providing the connection between the pre-slab and slab e consists in applying bonding agent e', on the surface of the pre-slabs prior to casting the concrete of slab e.

Once the cast element which will become the pre-slab has reached an adequate setting stage, it is put in position with its permanent shuttering or drain on supports f of the filter.

The second stage of the method consists in casting in single operation on the pre-slab a sufficient quantity of concrete for forming the slab e as such, and thereby reaching the desired thickness of the floor.

According to the invention, two techniques are used in combination: the use of the permanent shuttering and a two stage casting of reinforced concrete, which provides great flexibility and simplicity of execution.

The advantages afforded by the method according to the invention are, in particular, the following:

The combined carrying self-supporting element, which gives mechanical strength to the structural assembly permits even for floors of small thickness which are currently being used, large spans between supports without necessitating reinforcement or shoring.

The tightness of the floor, which is formed according to the invention, is provided by the continuity of the concrete of the slab formed during the last stage of the method, the tightness with respect to the peripheral walls being ensured by known means such as a seal, a tightness seam or embedding. It is possible with a single peripheral seal to remedy the differential deformations of the floor with respect to is supports.

EXAMPLE or a filter having a surface of 18 m$^2$, a standard technique for making a filter floor with a thickness of 0.10 m, subjected to filtration and washing efforts, consists in associating thirty-five reinforced concrete prefabricated slabs having a size of 82 m×0.60 m×0.10 m. These slabs are placed on eight supports (six intermediate beams plus two benches forming edge supports) and they are jointed to each other and to the support via anchoring stems which are bolted on the plate. The tightness of the assembly is provided by making and placing a seal around each slab as well as at the periphery of the filter.

The method according to the invention allows, for the same surface, but forming a floor of the same thickness with only five supports (three intermediate beams plus two edge supports), with a span which is equal to 1.30 m and a single tightness seal on the periphery of the filter. This floor, which has a total thickness of 0.10 m, will be made of four reinforced concrete pre-slabs of a thickness of 0.05 m, with a size of 1.25 m×0.50 m (whereby several elements can be jointed for making a preslab). It is formed with the necessary number of openings for the members of the recovery of the filtrated water and the distribution of the washing water and air, for example fifty in number per square meter of filter area.

We claim:

1. A method for forming a floor for filters, particularly for filters including granular filtrating material, said method comprising:
   (a) forming a first stage of said floor by casting material into a plurality of pre-slabs having openings, said openings adapted to house nozzles for washing the filter;
   (b) positioning said pre-slabs on supports of the filter; and
   (c) casting material on said plurality of pre-slabs in a second stage to reach the required total thickness of the floor and to fill in any gaps between said pre-slabs, thereby providing a continuous slab to receive the granular filtrating material.

2. The method according to claim 1, wherein said first stage of said floor is formed from the cast material and a bottom layer.

3. The method according to claim 1, wherein the total thickness of said floor is at least twice the thickness of said first stage.

4. The method according to claim 1, further providing reinforcement means in said first stage to extend into the material cast in said second stage.

5. The method according to claim 1, further applying a bonding agent to the upper surface of said pre-slab prior to casting said second stage.

6. The method according to claim 1, wherein said material is concrete.

7. A floor for a filter, formed by the method according to claim 1.

* * * * *